Figure 1:
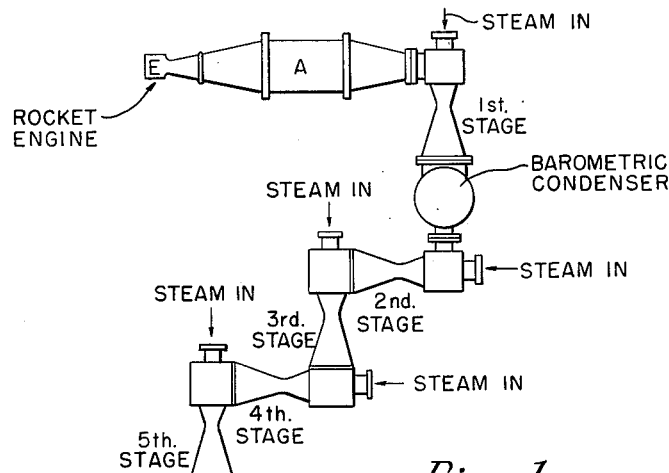

Jan. 25, 1966  N. Y. ROTHMAYER ETAL  3,230,707
STEAM GENERATOR
Filed Aug. 8, 1961  2 Sheets-Sheet 1

INVENTORS
NOËL Y. ROTHMAYER
HARRISON W. BURTON
LEIGH M. BACHMAN
CARL E. KASTNER JR.
BY
AGENT

Jan. 25, 1966 N. Y. ROTHMAYER ETAL 3,230,707
STEAM GENERATOR
Filed Aug. 8, 1961 2 Sheets-Sheet 2

INVENTORS
NOËL Y. ROTHMAYER
HARRISON W. BURTON
LEIGH M. BACHMAN
CARL E. KASTNER JR.
BY
AGENT

United States Patent Office 3,230,707
Patented Jan. 25, 1966

3,230,707
STEAM GENERATOR
Noel Y. Rothmayer, Morristown, Harrison W. Burton, Sparta, and Leigh M. Bachman and Carl E. Kastner, Jr., Denville, N.J., assignors to Thiokol Chemical Corporation, Bristol, Pa., a corporation of Delaware
Filed Aug. 8, 1961, Ser. No. 130,151
7 Claims. (Cl. 60—39.55)

This invention relates generally to jet pumping systems and more particularly to a combination gas generator-steam jet pumping system and to an improved method of and apparatus for generating gases therefor.

Jet pumping systems of the steam evactor type have many applications some of which may be generalized as those applications where short duty cycle operation is required in processes such as vacuum service, refrigeration, crystallization, evaporation, drying, filtering, mixing, and chemical processing where high temperature steam is required for short durations.

Of these applications, vacuum service has become of tremendous importance because of the rapid technological strides made in connection with scientific development for the exploration of space. Successful space travel necessitates first the simulation of extremely high altitudes for specialized applications such as space vehicle testing involving engines, components, or complete space vehicle systems, and the testing of equipment to be used in a space unit or station including moon base equipment.

In testing rocket engines which will be used to power flights beyond the world's atmosphere, it is necessary and desirable that these engines be operated at exhaust pressures corresponding to the near perfect vacuum existing there. To achieve a condition of very low back pressure at the exit of a rocket chamber while it is being tested in the earth's atmosphere, the rocket exhaust gases must be removed from the nozzle exit at a rate which will produce the desired gas pressure or density. In a 10,000 lb. thrust engine, approximately 40 pounds per second of exhaust gases have to be handled by an ejection system.

In a typical steam ejector system for such an application, staging is required to obtain the very low rocket engine exhaust back pressures desired. Rocket exhaust gases include non-condensable components and as an example calculations disclose that it is possible to use over 300 pounds per second of steam for each pound of non-condensable gas at an extremely low back pressure. Thus, the amount of steam required by the system to simulate very high altitudes for large rocket engines requires steam production facilities representing several millions of dollars of capital investment which is usually beyond the means of private manufacturing firms except on a very limited scale.

The main object of the present invention is to provide a combination gas generator-steam jet pumping system, and an improved method of and apparatus for generating gases therefor which will produce the total amount of steam required to achieve a desired back pressure or degree of vacuum for space simulation tests, at an overall reduction in capital investment.

An important object of the present invention is to provide an improved method of and apparatus for steam generation which will, when used in a jet pumping system, produce the total quantity of steam required to obtain desired low pressures by eliminating the non-condensable gas from the motive steam of the jet pumping system.

Another important object of the present invention is to provide an improved method of and apparatus for generating motive steam by decomposing hydrogen peroxide and utilizing hydrogen to react with the oxygen liberated by the catalytic reaction of the hydrogen peroxide to thus remove the non-condensable gas from the motive fluid.

A further important object of the present invention is to provide a combination gas generator-steam jet ejector or pumping system and an improved method of and apparatus for generating steam therefor which will produce large amounts of steam in a short amount of time with a material reduction in both the size of the equipment and in the necessary capital investment required therein.

Other objects and advantages of the present invention will become apparent during the course of the following description.

Figure 3:
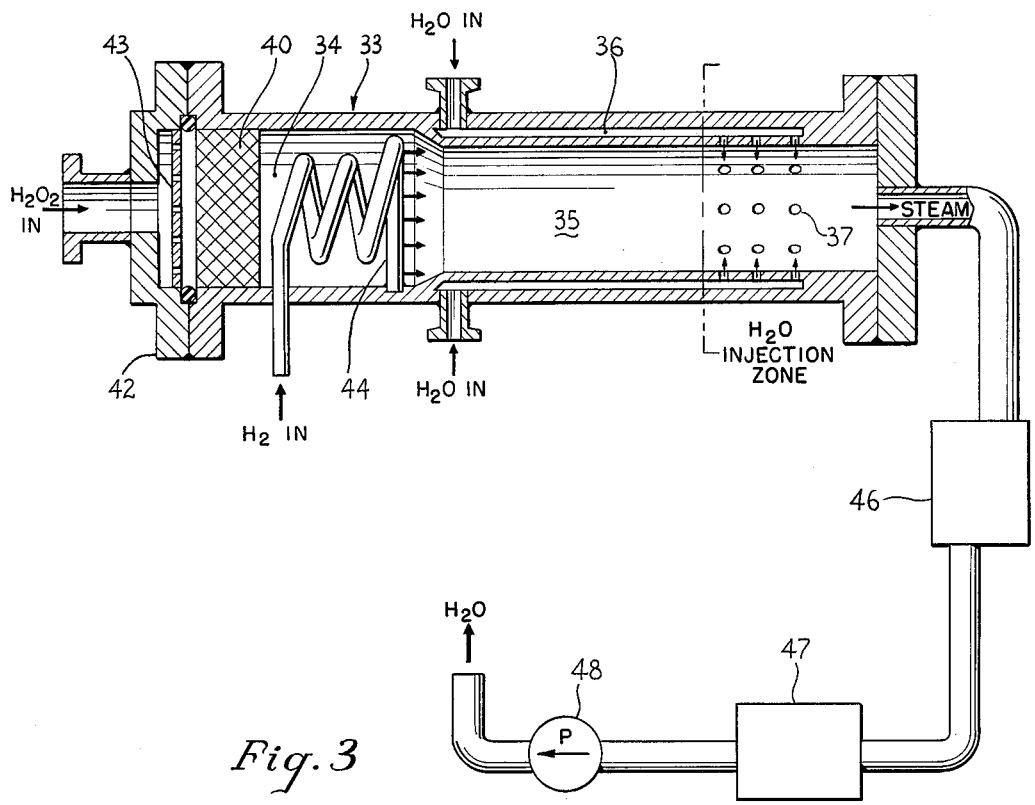
Figure 2:
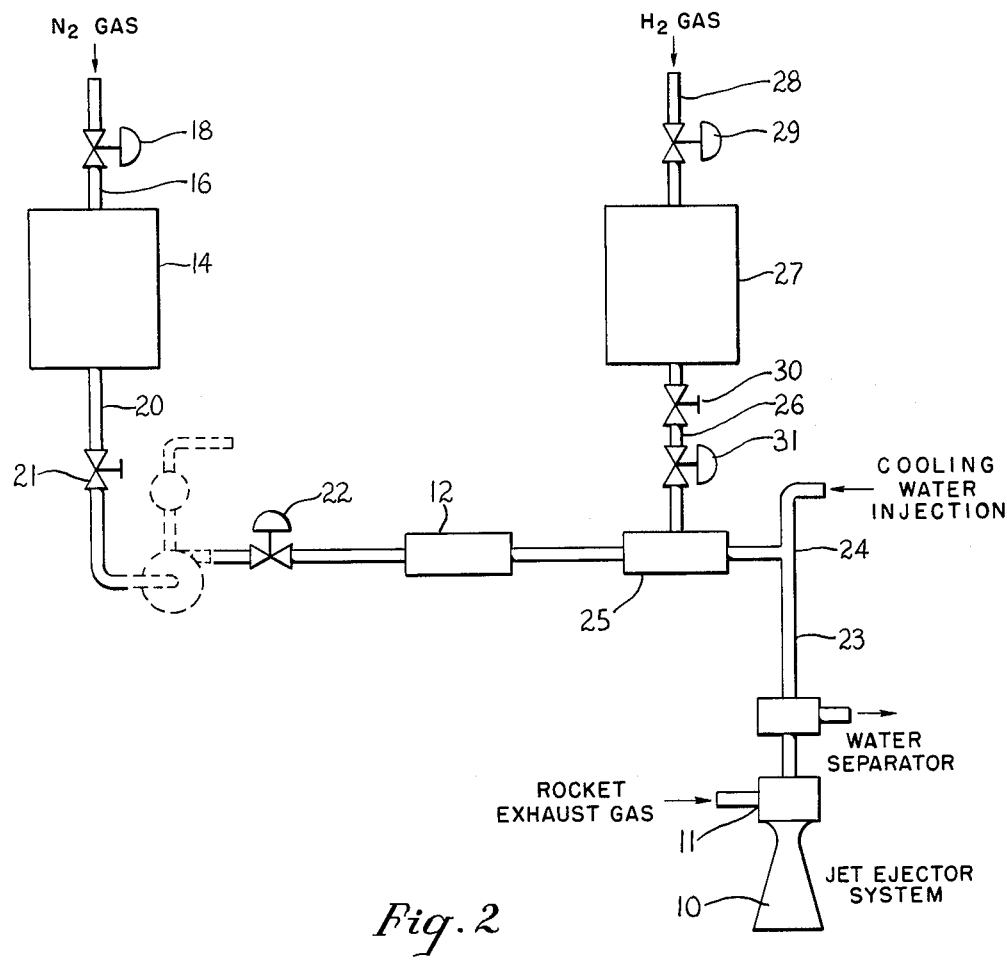

In the drawings we have shown one embodiment of the invention. In this showing:

FIGURE 1 is a schematic view of a typical five stage steam ejector system currently necessary for withdrawing the gas from a rocket engine at a desired rate;

FIGURE 2 is a schematic view of the improved apparatus and system comprising a part of the present invention; and FIGURE 3 is a central longitudinal sectional view of one form of steam generator with which the improved method of generating steam for the system may be practiced, with an associated schematic representation of the manner in which the water for and from steam generation may be recycled.

In its broadest aspects, the invention contemplates an improved steam generating method and apparatus for producing large quantities of high pressure superheated steam and having characteristics which also render them peculiarly valuable in certain applications such as the jet ejector system embodying the same herein described.

FIGURE 1 discloses a typical five stage steam ejector system for lowering the back pressure of a rocket engine E by evacuating a chamber A into which its exhaust gases are discharged to simulate very high altitude conditions while operating in the earth's atmosphere. The need for staging is shown by the following table:

| Altitude | Back Pressure P.S.I.A. | Ratio Lb/Lb Steam/Non-Condensable | Stage | Pressure Range P.S.I.A. |
|---|---|---|---|---|
| 150,000 | 0.005 | 270–300:1 | 2 | 0.6 |
|  |  |  | 1 | 0.1–0.3 |
|  |  | 1:1 | 1 | 0.05 |
|  |  | 2:1 | 1 | 0.005 |
|  |  | 3.3:1 |  |  |
|  |  | Total ratio 306.3:1 |  |  |

From the foregoing table, it will be seen that the exhaust pressure is reduced to approximately 0.6 p.s.i.a. in two stages with condensation. These stages require a total of 300 lb. of steam per pound of non-condensable gas in the rocket engine exhaust. Further reductions in back pressure are obtained by adding more condensing stages.

In the five stage system shown, the table shows the amounts of steam required in each stage per pound of non-condensable gas in the rocket exhaust products. The total steam consumption for the five stages is 306 pounds per second or 1,101,000 pounds per hour per pound of non-condensable gas. For a 10,000 pound thrust engine, if liquid oxygen and liquid ammonia are used as propellants, the amount of non-condensables in the exhaust gases is approximately 40%. Therefore, at a flow rate of 40 pounds per second, the non-condensables are 16 pounds per second, and the steam required to handle this flow is fifteen to sixteen million pounds per hour to maintain the exhaust back pressure at an equivalent 150,000 foot altitude.

The foregoing steam rate is approximately equal to twice that of the Hellgate Station in New York City. It will thus be appreciated that altitude simulation for large rocket engines normally requires facilities comparable to those at Tullahoma, Tennessee where the output of the TVA power complex is fed into the test station on off-peak hours to supply the power required to operate the altitude equipment. Such a situation, of course, imposes severe limitations on high altitude testing.

The present invention as disclosed in FIGURES 2 and 3 comprises a system embodying a method of and apparatus for generating large quantities of steam to operate jet ejectors at reasonable cost and with a reduction in size of the steam generating equipment required.

FIGURE 2 illustrates schematically the various components utilized to provide the motive power for a jet 10 operated by the exhaust products from a catalyst steam generator 12, to lower the pressure of the rocket exhaust gases entering at 11. A storage tank 14 of hydrogen peroxide ($H_2O_2$) is pressurized via a conduit 16 by a source of nitrogen gas controlled by a regulating valve 18 and supplies the propellant to the steam generator 12 by a conduit 20 which is provided with a safety valve 21 and a control or orifice valve 22.

If desired, control of the flow rate can be accomplished by three methods: by the pressurized tank 14 of propellant flowing through the control valve 22 or limiting orifice to the steam generator 12 as shown; by the same pressurized tank to supply a suppression head to a pump system (dotted lines) where the speed is regulated to provide the correct flow to the generator; and by a pressurized tank system, with no controls at the inlet section to the steam generator 12, but with an overboard dump system (not shown) to by-pass a controlled quantity of products from the steam generator 12 prior to entry into the jet ejector 10.

The $H_2O_2$ propellant supplied to the steam generator 12 is broken down by a suitable catalyst therein into steam and oxygen at a temperature of approximately 1400° F. and this mixture may be passed with its non-condensable components directly to the jet ejector 10 by a conduit 23. If necessary, this mixture may be cooled by means of water injection as at 24 to keep the exhaust product temperature compatible with the melting points of the metals used in the jet. In the event that excessive water is added and the mixture contains some moisture, a separator 25 is installed in the conduit 23 of the system between the jet 10 and the injection of water at 24.

The combination gas generator-steam jet system disclosed thus far in FIGURE 2 is a major advance in the art. However, an important addition thereto is the provision of means which will reduce the total quantity of steam required by eliminating the non-condensable gas (oxygen) from the motive fluid by converting it into steam and allowing the use of interstage condensers to reduce the load on later stages.

A hydrogen burner 25 is arranged in the conduit 23 and is supplied with hydrogen by a conduit 26 from a storage tank 27 which is under pressure by a source of hydrogen or a suitable inert gas furnished thereto by a conduit 28 controlled by a regulator valve 29, the conduit 26 including a safety valve 30 and a control valve or orifice 31. This arrangement utilizes the hydrogen to react with the oxygen generated by the catalytic reaction of the hydrogen peroxide. This removes all of the non-condensable oxygen from the motive fluid and, in effect, reduces the size required for the jet injectors by the use of suitable interstage condensers. The addition of water as at 24 cools the hot reactant gas to a suitable temperature and also increases the quantity of available steam for motive power.

FIGURE 3 discloses one form of a steam generator 33 which embodies inventive principles of the system disclosed in FIGURE 2 in generating steam by using 90% hydrogen peroxide, gaseous hydrogen ($H_2$) and water ($H_2O$).

The steam generator 33 is an elongated cylinder including a decomposition chamber 34 and a combustion chamber 35 having a water jacket 36 and a plurality of circumferentially spaced perforations or apertures 37 for the injection of water into the combustion chamber. A suitable catalyst 40, such as a silver screen, is mounted in the front of the decomposition chamber 34 which is closed by a header 42 in which an $H_2O_2$ injector plate 43 is fixed. The hydrogen is introduced into the front of the combustion chamber 35 by means of a preheating coil 44 fixed in the aft part of the decomposition chamber 34, the coil having a plurality of injection orifices as indicated by the arrows.

In the operation of the catalytic steam injector 33, 90% hydrogen peroxide is supplied through the header 42 to the injector plate 43 where it is injetced into the catalyst 40. The resulting catalytic decomposition of the $H_2O_2$ evolves steam, oxygen and heat where the final gas temperature is approximately 1340° F. Gaseous hydrogen is now supplied to the preheating coil 44 where it is heated and injected, as indicated by the arrows, into the hot gas stream.

Instantaneous combustion of the hydrogen and oxygen takes place in the combustion chamber 35 with a rapid rise in temperature and pressure. The combustion chamber is regeneratively cooled with water furnished to the jacket 36 and at the down stream end of the chamber, this water is injected through the apertures 37 into the hot gas stream to lower the overall temperature and to also provide a large increase in generated steam output.

The approximate weight proportions of $H_2O_2$, $H_2$, and $H_2O$ to generate 600° F. steam are as follows:

31.3% $H_2O_2$ + 1.4% $H_2$ + 67.3% $H_2O$ = 100% steam

The saturated, dry or superheated steam then passes to and is used as the motivating fluid for a jet vacuum pump indicated as 46 in the schematically shown system of FIGURE 3. After use in the pump, the steam can be condensed by a condenser 47 and recircultaed by a pump 48 back to the water jacket 36.

It will now be apparent that the combination gas generator-steam jet pumping system and the method of and apparatus for generating steam described in combination therewith and per se comprises a highly important advance in the art. This is particularly true as applied to evacuating equipment for high altitude simulation tests in reducing size of equipment, and many technological advances will be enabled and accelerated by the simplified and enhanced testing assured by the invention.

In addition to the applications set forth, the invention may be used aboard naval vessels for the operation of bilge or emergency pumping systems under damage from battle conditions where the draw on the steam boilers cannot be increased without endangering the vesel, and similarly in industrial applications where large quantities of steam are required for relatively short periods of time, or where a portable steam plant utilized with a jet injector could be used for emergency pumping purposes to handle extremely large volumes of liquid.

The invention has the advantage in all such applications: of an initial low cost of installation amounting to a small percentage of conventional steam boiler installations; of providing large quantities of superheated steam in a short period of time; and of variation of the superheat and pressure of the output steam to satisfy a wide range of requirements.

It is to be understood that the form of our invention herewith shown and described is to be taken as a preferred example of the same and that various changes in the shape, size and arrangement of parts may be resorted to without departure from the spirit of the invention or the scope of the subjoined claims.

What is claimed is:

1. An apparatus for generating steam comprising a generator having a forward decomposition chamber terminating in a rear combustion chamber, a water jacket surrounding said combustion chamber, apertures formed in the wall of said combustion chamber and affording communication between it and said water jacket, a catalyst mounted in said forward chamber, means for delivering hydrogen peroxide under pressure into contact with said catalyst for catalytic decomposition in said forward chamber into non-condensable oxygen and steam at high temperatures, and means for furnishing cooling water to said jacket and into said combustion chamber through said apertures to instantaneously generate additional steam for discharge with said first mentioned steam from the rear of said combustion chamber.

2. An apparatus for generating steam comprising a generator having a forward decomposition chamber terminating in a rear combustion chamber, a water jacket surrounding said combustion chamber, apertures formed in the wall of said combustion chamber and affording communication between it and said water jacket, a catalyst mounted in said forward chamber, means for delivering hydrogen peroxide under pressure into contact with said catalyst for catalytic decomposition in said forward chamber into non-condensable oxygen and stream at high temperatures, means for furnishing cooling water to said jacket and into said combustion chamber through said apertures to instantaneously generate additional steam for discharge with said first mentioned steam from the rear of said combustion chamber, and means communicating with the head of said combustion chamber for eliminating the non-condensable oxygen therefrom and increasing the temperature and pressure of the chamber.

3. The apparatus recited in claim 2 wherein said communicating means comprises a source of gaseous hydrogen under pressure, and a conduit connecting said source with said chamber head to admit hydrogen thereto for combustion with said oxygen.

4. The apparatus recited in claim 3 wherein said conduit includes a coil arranged in said decomposition chamber to effect preheating of at least a portion of said hydrogen.

5. The method of operating a steam generator having a catalyst mounted therein and a water jacket encircling and then communicating with the generator which comprises bringing hydrogen peroxide into contact with the catalyst to decompose said peroxide to form a mixture of steam and oxygen at an elevated temperature, adding hydrogen to said mixture to react with the oxygen thereof to convert said mixture into superheated steam substantially free from noncondensable constituents, and adding water from the water jacket to said superheated steam to cause said water to vaporize and form an additional quantity of steam.

6. A method according to claim 5 and wherein said water is preheated by indirect heat exchange with said superheated steam before being introduced thereinto.

7. The method of operating a steam generator having a catalyst mounted therein which comprises bringing hydrogen peroxide into contact with the catalyst to decompose said peroxide to form a mixture of steam and oxygen at an elevated temperature, bringing hydrogen into indirect heat exchange relation with said mixture to preheat said hydrogen, and thereafter adding said preheated hydrogen to said mixture to react with the oxygen thereof to convert said mixture into superheated steam substantially free from noncondensable constituents.

References Cited by the Examiner

UNITED STATES PATENTS

| | | | |
|---|---|---|---|
| 822,491 | 6/1906 | Tonkin. | |
| 1,142,271 | 6/1915 | Rinehart | 60—39.05 X |
| 1,483,917 | 2/1924 | Tucker | 60—39.05 |
| 2,615,331 | 10/1952 | Lundgren | 73—116 |
| 2,791,883 | 5/1957 | Moore et al. | 60—35.6 |
| 2,992,527 | 7/1961 | Masnick et al. | |
| 3,101,592 | 8/1963 | Robertson et al. | |

SAMUEL LEVINE, *Primary Examiner.*

JULIUS E. WEST, ABRAM BLUM, CARLTON R. CROYLE, *Examiners.*